(12) United States Patent
Chien (10) Patent No.: US 7,020,166 B2
(45) Date of Patent: Mar. 28, 2006

(54) SWITCH TRANSFERRING DATA USING DATA ENCAPSULATION AND DECAPSULATION

(75) Inventor: Sheng Feng Chien, I-Lan (TW)

(73) Assignee: Broadcom Corporation, Irvine, CA (US)

( * ) Notice: Subject to any disclaimer, the term of this patent is extended or adjusted under 35 U.S.C. 154(b) by 769 days.

(21) Appl. No.: 09/805,903

(22) Filed: Mar. 15, 2001

(65) Prior Publication Data

US 2002/0061018 A1    May 23, 2002

Related U.S. Application Data (60) Provisional application No. 60/237,764, filed on Oct. 3, 2000.

(51) Int. Cl.
*H04J 3/12* (2006.01)
*H03M 13/00* (2006.01)

(52) U.S. Cl. .................... 370/528; 370/389; 370/466; 714/752

(58) Field of Classification Search ............ 370/466, 370/395.1, 389, 397, 401–406, 523, 528, 370/529; 714/799, 807, 776, 781, 788, 752; 380/42–43
See application file for complete search history.

(56) References Cited

U.S. PATENT DOCUMENTS

| | | | |
|---|---|---|---|
| 4,577,313 A | 3/1986 | Sy | |
| 5,050,165 A | 9/1991 | Yoshioka et al. | |
| 5,081,621 A | 1/1992 | Sugimoto | |
| 5,278,789 A | 1/1994 | Inoue et al. | |
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,541,995 A * | 7/1996 | Normile et al. ............... 380/42 |
| 5,555,398 A | 9/1996 | Raman | |

(Continued)

FOREIGN PATENT DOCUMENTS

EP    0312917 A2    4/1989

(Continued)

OTHER PUBLICATIONS

"A High-Speed CMOS Circuit for 1.2-Gb/s 16×16 ATM Switching," Alain Chemarin et al. 8107 IEEE Journal of Solid-State Circuits 27(1992) Jul., No. 7, New York, US, pp. 1116-1120.

(Continued)

*Primary Examiner*—Steven Nguyen
(74) *Attorney, Agent, or Firm*—Squire, Sanders & Dempsey L.L.P.

(57) ABSTRACT

A method for encapsulating and decapsulating information into a data packet being transmitted through a plurality of switches. The method has the steps of receiving a data packet in a first switch for transmission to a second switch and encapsulating information into a field of said data packet so that the information, when encapsulated into the data packet, does not increase the size of the data packet. The method also has the steps of transmitting the data packet having the information encapsulated in the data packet to the second switch and receiving the data packet having the information encapsulated in the data packet in the second switch. The final step is the step of decapsulating the information encapsulated in the data packet.

30 Claims, 10 Drawing Sheets

U.S. PATENT DOCUMENTS

| | | | |
|---|---|---|---|
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,751,723 A * | 5/1998 | Vanden Heuvel et al. | 370/528 |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,862,160 A * | 1/1999 | Irvin et al. | 370/529 |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,949,786 A | 9/1999 | Bellenger | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,119,196 A | 9/2000 | Muller et al. | |
| 6,151,324 A * | 11/2000 | Belser et al. | 370/397 |
| 6,157,651 A * | 12/2000 | Meares et al. | 370/403 |
| 6,175,902 B1 | 1/2001 | Runaldue et al. | |
| 6,185,185 B1 | 2/2001 | Bass et al. | |
| 6,597,695 B1 * | 7/2003 | Desai et al. | 370/395.1 |
| 6,609,226 B1 * | 8/2003 | Figueira | 714/807 |
| 6,678,854 B1 * | 1/2004 | Irvin | 714/752 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0 860 961 A2 | 8/1998 |
| EP | 0 860 961 A3 | 8/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

| SYNDROME | DATA | DISTANCE VECTOR |
|---|---|---|
| 0x C7_04_DD_7B | 0 | 0x 00_00_00_00 |
| 0x 66_34_9B_90 | 1 | 0x 01_01_01_01 |
| 0x 15_FC_70_D5 | 2 | 0x 02_02_02_02 |
| 0x B4_CC_36_3E | 3 | 0x 03_03_03_03 |
| 0x AE_78_8B_AC | 4 | 0x 04_04_04_04 |
| 0x 0F_48_CD_47 | 5 | 0x 05_05_05_05 |
| 0x 7C_80_26_02 | 6 | 0x 06_06_06_06 |
| 0x DD_B0_60_E9 | 7 | 0x 07_07_07_07 |
| 0x 71_DA_78_CB | 8 | 0x 08_08_08_08 |
| 0x D0_EA_3E_20 | 9 | 0x 09_09_09_09 |
| 0x A3_22_D5_65 | 10 | 0x 10_10_10_10 |
| 0x 02_12_93_8E | 11 | 0x 11_11_11_11 |
| 0x 18_A6_2E_1C | 12 | 0x 12_12_12_12 |
| 0x B9_96_68_F7 | 13 | 0x 13_13_13_13 |
| 0x CA_5E_83_B2 | 14 | 0x 14_14_14_14 |
| 0x 6B_6E_C5_59 | 15 | 0x 15_15_15_15 |

SWITCH TRANSFERRING DATA USING DATA ENCAPSULATION AND DECAPSULATION

REFERENCE TO RELATED APPLICATIONS

This application claims priority to U.S. Provisional Patent Application Ser. No. 60/237,764 entitled Prowler Layer 2 Switch, filed on Oct. 3, 2000. The contents of this provisional application are hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture geared to power efficient and cost sensitive markets, and which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. A gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a method and apparatus for transferring data using data encapsulation and decapsulation.

One embodiment of the invention is a method for encapsulating and decapsulating information into a data packet being transmitted through a plurality of switches. The method has the steps of receiving a data packet in a first switch for transmission to a second switch and encapsulating information into a field of said data packet so that the information, when encapsulated into the data packet, does not increase the size of the data packet. The method also has the steps of transmitting the data packet having the information encapsulated in the data packet to the second switch and receiving the data packet having the information encapsulated in the data packet in the second switch. The final step is the step of decapsulating the information encapsulated in the data packet.

In another embodiment the invention is a system for encapsulating and decapsualting information into a data packet being transmitted through a plurality of switches. The system has a first switch having a transmitter and an encapsulating module that encapsulates information into a field of a data packet so that the information, when encapsulated into the data packet, does not increase the size of the data packet. The system also has a second switch having a receiver, wherein when the transmitter of the first switch transmits the data packet having the information encapsulated in the data packet to the receiver of the second switch, wherein the receiver of the second switch receives the data packet having the information encapsulated in the data packet. The second switch also has a decapsulating module that decapsulates the information encapsulated in the data packet to determine the information encapsulated in the data packet.

In another embodiment the invention is a switch for encapsulating and depcapsulating information into a data packet. The switch has a transmitter that transmits data packets, an encapsulating module that encapsulates information into a data packet before the transmitter transmits the data packet, a receiver for receiving transmitted data packets, and a decapsulating module that decapsulates information from the transmitted data packets received by the receiver.

BRIEF DESCRIPTION OF THE DRAWINGS

The objects and features of the invention will be more readily understood with reference to the following description and the attached drawings, wherein.

DETAILED DESCRIPTION OF THE INVENTION

Figure 1:
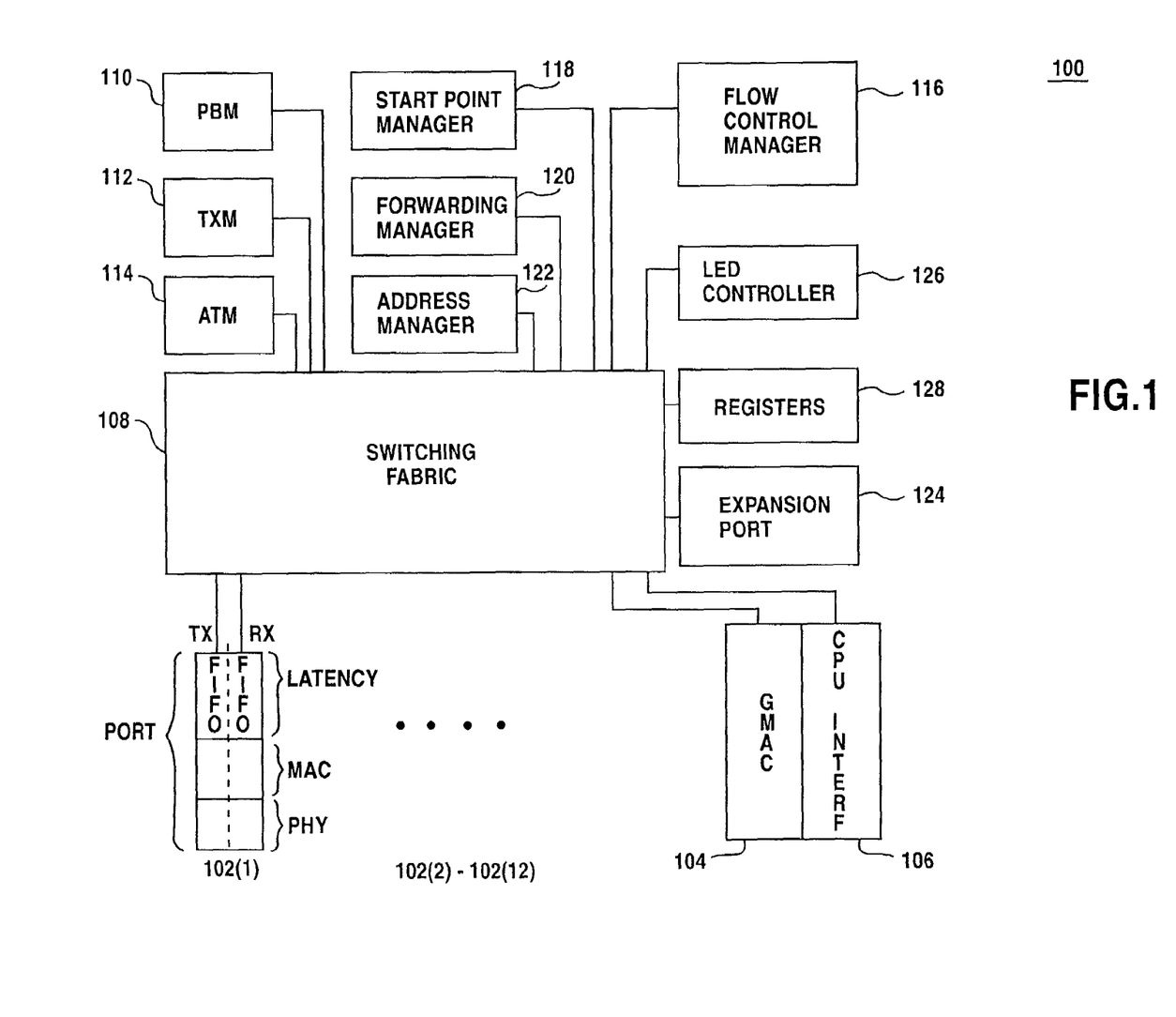
FIG. 1 is a general block diagram of elements of the present invention.

FIG. 1 is an example of a block diagram of a switch 100 of the present invention. In this example, switch 100 has 12 ports, 102(1)–102(12), which can be fully integrated IEEE compliant ports. Each of these 12 ports 102(1)–102(12) can be 10 BASE-T/100 BASE-TX/FX ports each having a physical element (PHY), which can be compliant with IEEE standards. Each of the ports 102(1)–102(12), in one example of the invention, has a port speed that can be forced to a particular configuration or set so that auto-negotiation will determine the optimal speed for each port independently. Each PHY of each of the ports can be connected to a twisted-pair interface using TXOP/N and RXIP/N as transmit and receive protocols, or a fiber interface using FXOP/N and FXIP/N as transmit and receive protocols.

Each of the ports 102(1)–102(12) has a Media Access Controller (MAC) connected to each corresponding PHY. In one example of the invention, each MAC is a fully compliant IEEE 802.3 MAC. Each MAC can operate at 10 Mbps or 100 Mbps and supports both a full-duplex mode, which allows for data transmission and reception simultaneously, and a half duplex mode, which allows data to be either transmitted or received, but not both at the same time.

Flow control is provided by each of the MACs. When flow control is implemented, the flow of incoming data packets is managed or controlled to reduce the chances of system resources being exhausted. Although the present embodiment can be a non-blocking, wire speed switch, limitation can occur due to the limited memory space available. For example, during periods of packet flooding (i.e. packet broadcast storms), the available memory can be exhausted rather quickly. In order to enhance the operability of the switch in these types of situations, the present invention can implement two different types of flow control. In full-duplex mode, the present invention can, for example, implement the IEEE 802.3x flow control. In half-duplex mode, the present invention can implement a collision backpressure scheme.

In one example of the present invention each port has a latency block connected to the MAC. Each of the latency blocks has transmit and receive FIFOs which provide an interface to main packet memory. In this example, if a packet does not successfully transmitted from one port to another port within a preset time, the packet will be dropped from the transmit queue.

In addition to ports 102(1)–102(12), a gigabit interface 104 can be provided on switch 100. Gigabit interface 104 can support a Gigabit Media Independent Interface (GMII) and a Ten Bit Interface (TBI). The GMII fully compliant to IEEE 802.3ab, which only supports full duplex operation. The GMII can pass data at a rate of 8 bits every 8 ns resulting in a throughput of 2 Gbps including both transmit and receive data. In addition to the GMII, gigabit interface 104 can be configured to be a TBI, which is compatible with many industry standard fiber drivers. Since in some embodiments of the invention the MDIOIMDC interfaces (optical interfaces) are not supported, the gigabit PHY (physical layer) is set into the proper mode by the system designer.

Gigabit interface 104, like ports 102(1)–102(12), has a PHY, a Gigabit Media Access Controller (GMAC) and a latency block. The GMAC can be a fully compliant IEEE 802.3z MAC operating at 1 Gbps full-duplex only and can connect to a fully compliant GMII or TBI interface through the PHY. In this example, GMAC 108 provides full-duplex flow control mechanisms and a low cost stacking solution for either twisted pair or TBI mode using in-band signaling for management. This low cost stacking solution allows for a ring structure to connect each switch utilizing only one gigabit port.

A CPU interface 106 is provided on switch 100. In one example of the present invention, CPU interface 106 is an asynchronous 8 or 16 bit I/O device interface. Through this interface a CPU can read internal registers, receive packets, transmit packets and allow for interrupts. CPU interface 106 also allows for a Spanning Tree Protocol to be implemented. In one example of the present invention, a chip select pin is available allowing a single CPU control two switches. In this example an interrupt pin when driven low (i.e., driven to the active state) requiring a pull-up resistor will allow as many switch interrupts to be connected together as is desired.

A switching fabric 108 is also located on switch 100 in one example of the present invention. Switching fabric 108 can allow for full wire speed operation of all ports. A hybrid shared memory approach can also be implemented to minimize bandwidth and memory requirements. This architecture allows for efficient and low latency transfer of packets through the switch and also supports address learning and aging features, VLAN, port trunking and port mirroring.

Memory interfaces 110, 112 and 114 can be located on switch 100 and allow for the separation of data and control information. Packet buffer memory interface (PBM) 110 handles packet data storage while the transmit queue memory interface (TXM) 112 keeps a list of packets to be transmitted and address table/control memory interface (ATM) 114 handles the address table and header information. Each of these interfaces, in one example of the invention, uses SSRAM that can be configured in various total amounts and chip sizes.

PBM 110 is located on switch 100 and can have an external packet buffer memory (not depicted) that is used to store the packet during switching operations. In one example of the invention, packet buffer memory is made up of multiple 256 byte buffers. Therefore, one packet may span several buffers within memory. This structure allows for efficient memory usage and minimizes bandwidth overhead. The packet buffer memory can be configurable so that up to 4 Mbytes of memory per chip can be used for a total of 8 Mbytes per 24+2 ports. In this example, efficient memory usage is maintained by allocating 256 byte blocks, which allows storage for up to 32K packets. PBM 110 can be 64 bits wide and can use either a 64 bit or 32 bit wide memory and can run at 100 MHz.

TXM 112 is located on switch 100 and can have an external transmit queue memory (not depicted). TXM 112, in this example, maintains 4 priority queues per port and allows for 64K packets per chip and up to 128K packets per system. TXM 112 can run at a speed of up to 100 MHz.

ATM 114 can be located on switch 100 and can have an external address table/control memory (not depicted) used to store the address table and header information corresponding to each 256 byte section of PBM 110. Address table/control memory allows up to 16K unique unicast addresses. The remaining available memory is used for control information. ATM 114, in this example, runs up to 133 MHz.

Switch 100, in one example of the invention, has a Flow Control Manager 116 that manages the flow of packet data. As each port sends more and more data to the switch, Flow Control Manager 116 can monitor the amount of memory being used by each port 102(1)–102(12) of switch 100 and the switch as a whole. In this example, if one of the ports 102(1)–102(12) or the switch as a whole is using up to much memory, Flow Control Manager 116 will issue commands over the ATM Bus requesting the port or switch to slow down and may eventually drop packets if necessary.

In addition to Flow control manager 116, switch 100 also has a Start Point Manager (SPM) 118, a Forwarding Manager (FM) 120 and an Address Manager (AM) 122.

Start Point Manager (SPM) 118, in one example of the present invention, keeps track of which blocks of memory in PBM 110 are being used and which blocks of memory are free.

Forwarding Manager 120 can for example forward packet data to appropriate ports for transmission.

Address Manager (AM) 122 can manage the address table including learning source addresses, assigning headers to packets and keeping track of these addresses. In one example of the invention, AM 122 uses aging to drop addresses that have not been used for some specified time period or sequence of events.

An expansion port 124 can also be provided on switch 100 to connect two switches together. This will allow for full wire speed operation on twenty-five 100M ports (includes one CPU port) and two gigabit ports. The expansion port 124, in this example, allows for 4.6 Gbps of data to be transmitted between switches.

An LED controller 126 can also be provided on switch 100. LED controller 126 activates appropriate LEDs to give a user necessary status information. Each port of the ports 102(1)–102(12), in one example of the invention, has 4 separate LEDs, which provide per port status information. The LEDs are fully programmable and are made up of port LEDs and other LEDs. Each LED can include a default state for each of the four port LEDs. An example of the default operation of each of the port LEDs are shown below.

| LED | DEFAULT OPERATION |
|---|---|
| 0 | Speed Indicator<br>OFF = 10 Mbps or no link<br>ON = 100 Mbps |
| 1 | Full/Half/Collision Duplex<br>OFF = The port is in half duplex or no link<br>BLINK = The port is in half duplex and a collision has occurred<br>ON = The port is in full duplex |
| 2 | Link/Activity Indicator<br>OFF = Indicates that the port does not have link<br>BLINK = Link is present and receive or transmit activity is occurring on the media<br>ON = Link present without activity |
| 3 | Alert Condition<br>OFF = No alert conditions, port is operating normally<br>ON = The port has detected an isolate condition |

In addition to the default operations for the port LEDs, each of the port LEDs can be programmed through registers. These registers can be set up, in one example of the invention, by a CPU. By having programmable registers that control LEDs, full customization of the system architecture can be realized including the programmability of the blink rate.

Each of the LEDs has a table where register bits $RA_{Ax}$, $R_{Bx}$ and $R_{Cx}$ can be set to provide a wide range of information. For example, register bits $R_{Ax}$, $R_{Bx}$ and $R_{Cx}$ can be set to determine when $LED_{ON}$, $LED_{BLINK}$ and $LED_{OFF}$ are activated or deactivated. In addition to the port LEDs, there are additional LEDs which indicate the status of the switch.

Registers 128 are located on switch 100 in this example of the present invention. Registers 128 are full registers that allow for configuration, status and Remote Monitoring (RMON) management. In this example, Registers 128 are arranged into groups and offsets. There are 32 address groups each of which can contain up to 64 registers.

Figure 2:
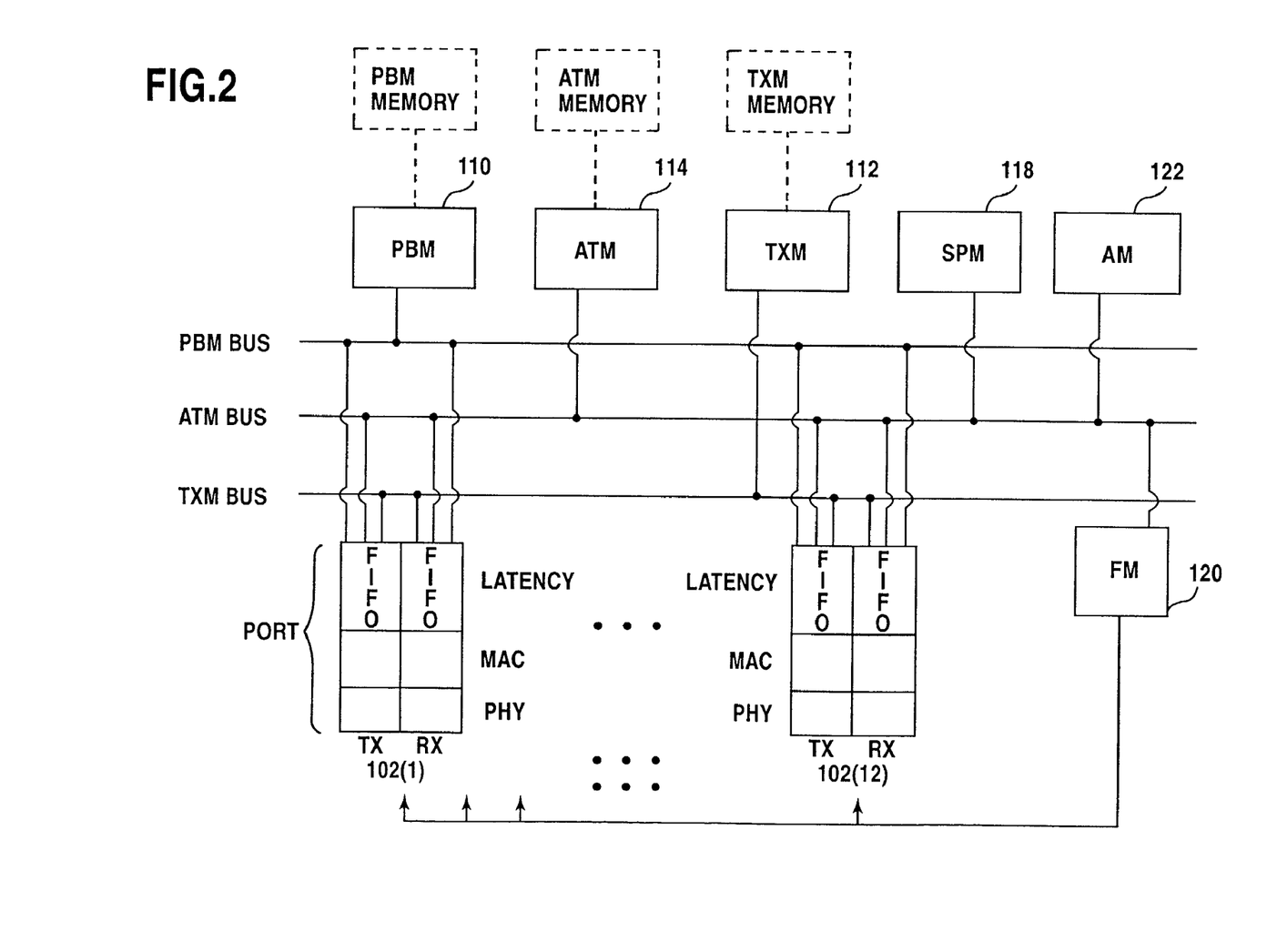
FIG. 2 illustrates the data flow on the CPS channel of a network switch according to the present invention.

FIG. 2 is an illustration of one embodiment of the invention having a PBM Bus, an ATM Bus, and a TXM Bus for communications with other portions of the switch. In this example PBM 110 is connected to the PBM Bus and an external PBM Memory; TXM 112 is connected to the TXM Bus and an external TXM Memory; and ATM 114 is connected to the ATM Bus and an external ATM Memory. Each of the transmit (TX) and receive (RX) portions of ports 102(1)–102(12) are connected to the PBM Bus, ATM Bus and TXM Bus for communications.

FM 120 is connected to each of the ports 102(1)–102(12) directly and is also connected to the ATM Bus for communications with other portions of the switch. SPM 118 and AM 122 are also connected to the ATM Bus for communications with other portions of the switch.

The operation of switch 100 for transmission of a unicast packet (i.e., a packet destined for a single port for output) in one example of the invention is made with reference to FIG. 2 as follows.

In this example the system is initialized following the release of a hardware reset pin. A series of initialization steps will occur including the initialization of external buffer memory and the address table. All ports on the switch will then be disabled and the CPU will enable packet traffic by setting an enable register. As links become good on the ports (ports 102(1)–102(12) and gigabit port 104), an SPT protocol will confirm these ports and the ports will become activated. After the initialization process is concluded normal operation of the switch can begin.

In this example, once a port has been initialized and activated, a PORT_ACTIVE command is issued. This indicates that the port is ready to transmit and receive data packets. If for some reason a port goes down or becomes disabled a PORT_INACTIVE command is issued.

During unicast transmission, a packet can be sent to port 102(1) from an external source to the receive (RX) PHY of port 102(1).

In this example, the RX MAC of port 102(1) will wait until a Start of Frame Delimiter (SFD) for the packet is detected. When the SFD is detected by the RX MAC portion of port 102(1), the RX MAC will place the packet into a receive (RX) FIFO of the latency block of port 102(1). As the RX FIFO becomes filled, port 102(1) will request to send a message over the ATM Bus to Address Manager (AM) 122 for an empty receive buffer. Once access to the ATM Bus is granted, the RX FIFO Latency block of port 102(1) sends packets received in the RX FIFO to the external PBM Memory through the PBM Bus and PBM 110 until the end of packet is reached.

The PBM Memory, in this example, is made up of 256 byte buffers. Therefore, one packet may span several buffers within the packet buffer memory if the packet size is greater than 256 bytes. Connections between packet buffers are maintained through a linked list system in one example of the present invention. A linked list system allows for efficient memory usage and minimized bandwidth overhead and will be explained in further detail with relation to FIG. 3A–FIG. 3D.

At the same time packets are being sent to the external PBM Memory, the port will also send the source address to Address Manager (AM) 122 and request a filtering table from AM 122.

If the packet is "good", the port writes the header information to the ATM memory through the ATM Bus and ATM 114. The port also sends a RECPE_COMPL command over the ATM Bus signifying that packet reception is complete. Other information is also sent along with the RECEP_COMPL command such as the start address and filtering table which indicates which ports the packet is to be sent out on. For example, a filtering table having a string such as "011111111111" would send the packet to all ports except port 1 and would have a count of 11. The count simply is the number of ports the packet is to be sent.

Forwarding Manager (FM) 120 is constantly monitoring the ATM Bus to determine if a RECEP_COMPL command has issued. Once FM 120 has determined that a RECEP_COMPL command has issued, Forwarding Manger (FM) 120 will use the filtering table to send packets to appropriate ports. It is noted that a packet will not be forwarded if one of the following conditions is met:

a. The packet contains a CRC error
b. The PHY signals a receive error
c. The packet is less than 64 bytes
d. The packet is greater than 1518 bytes or 1522 bytes depending on register settings
e. The packet is only forwarded to the same port as the receiving port If FM 120 detects a RECEP_COMPL command on the ATM Bus, FM 120 will decide if the packet is intended to be transmitted to one of its ports. The RECEP_COMPL command includes information such as a filter table, a start pointer, priority information and other miscellaneous information. FM 120 will read the filter table to determine if the packet is to be transmitted from on of its ports. If it is determined that the packet is to be transmitted from one of its ports, FM 120 will send the RECEP_COMPL command information directly to the port. In this case, the RECEP_COMPL command information is sent to the TX FIFO of port 102(12).

If the port is busy, the RECEP_COMPL command information is transferred to TXM Memory through the TXM Bus and TXM 112. The TXM memory is simply a queue of packets to be transmitted. TXM Memory is allocated on a per port basis so that if there are ten ports there are ten queues within the TXM Memory allocated to each port. As each of the ports transmitters becomes idle, each port will read the next RECEP_COMPL command information stored in the TXM Memory. The TX FIFO of port 102(12) will receive, as part of the RECEP_COMPL command information, a start pointer which will point to a header in ATM memory across the ATM Bus which in turn points to the location of a packet in the PBM Memory over the PBM Bus. The port will at this point request to load the packet into the transmit (TX) FIFO of port 102(12) and send it out through the MAC and PHY of port 102(12).

If the port is in half duplex mode, it is possible that a collision could occur and force the packet transmission to start over. If this occurs, the port simply re-requests the bus master and reloads the packet and starts over again. If however, the number of consecutive collisions becomes excessive, the packet will be dropped form the transmission queue.

Once the port successfully transmits a packet, the port will signal FM 120 that it is done with the current buffer. FM 120 will then decrement a counter which indicates how many more ports must transmit the packet. For example, if a packet is destined to eleven ports for output, the counter, in this example, is set to 11. Each time a packet is successfully transmitted, FM 120 decrements the counter by one. When the counter reaches zero this will indicate that all designated ports have successfully transmitted the packet. FM 120 will then issue a FREE command over the ATM Bus indicating that the memory occupied by the packet in the PBM Memory is no longer needed and can now be freed for other use.

When SPM 118 detects a FREE command over the ATM Bus, steps are taken to indicate that the space taken by the packet is now free memory.

Multicast and broadcast packets are handled exactly like unicast packets with the exception that their filter tables will indicate that all ports should transmit the packet. This will force the forwarding managers to transmit the packet out all of their ports.

Figure 3A:
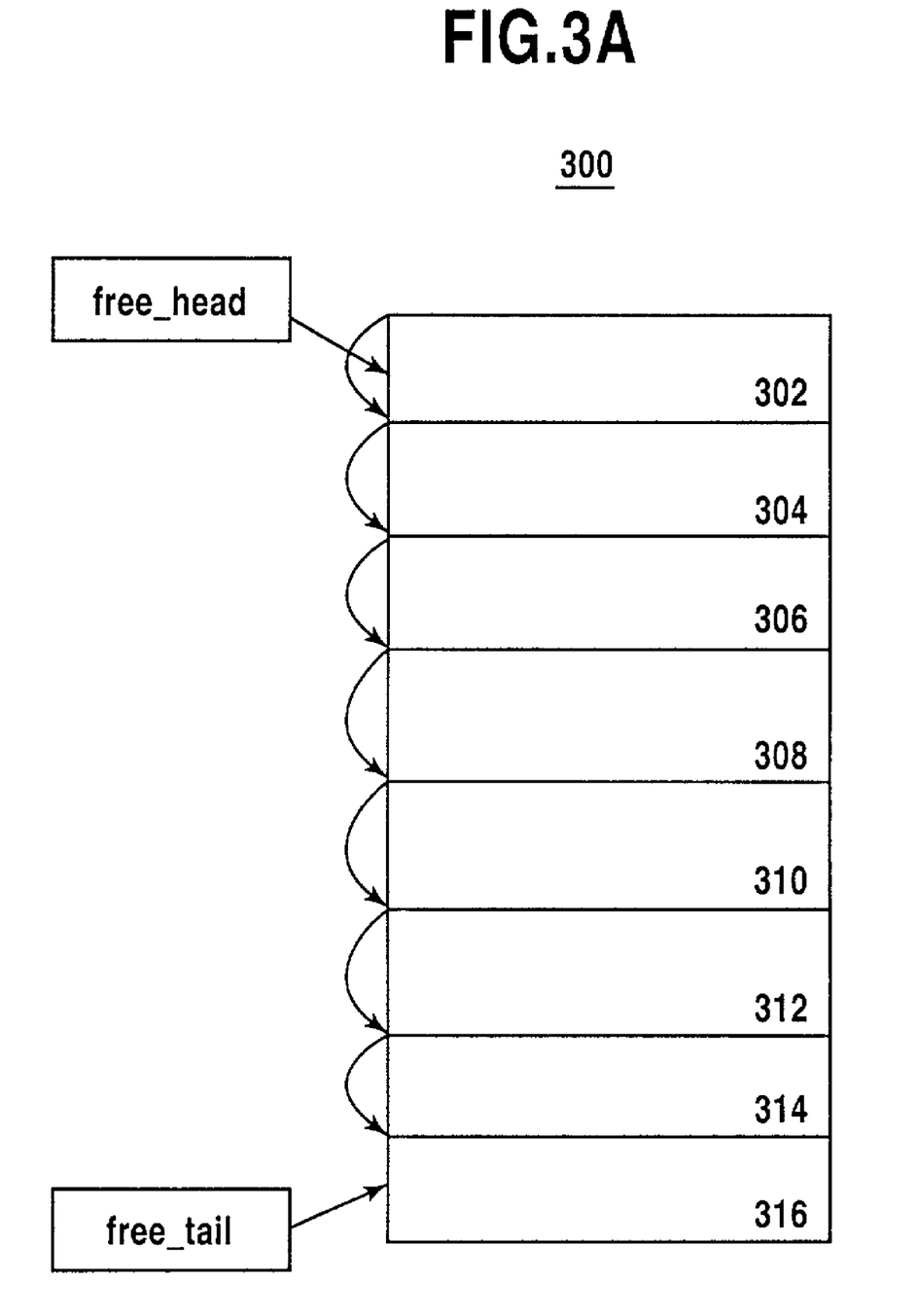
FIG. 3A illustrates a linked list structure of Packet Buffer Memory.

FIG. 3A is an illustration of a PBM Memory structure in one example of the invention. PBM Memory Structure 300 is a linked list of 256 byte segments 302, 304, 306, 308, 310, 312, 314 and 316. In this example segment 302 is the free_head indicating the beginning of the free memory linked list and segment 316 is the free_tail indicating the last segment of free memory.

Figure 3B:
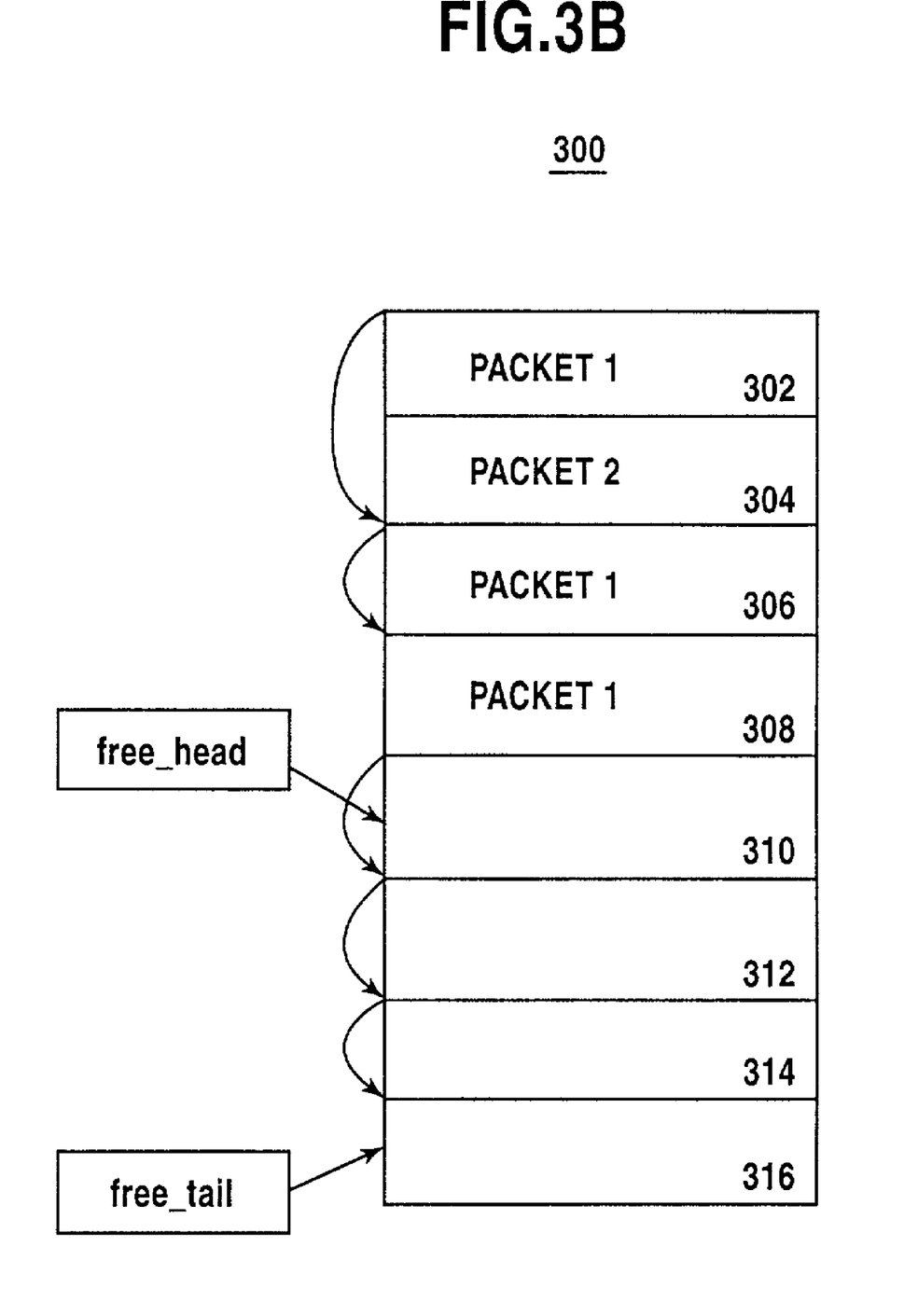
FIG. 3B illustrates a linked list structure of Packet Buffer Memory with two data packets.

In FIG. 3B two packets have been received and stored in the PBM Memory. Packet 1 occupies segments 302, 306 and 308 and packet 2 occupies segment 304. Segments 310, 312, 314 and 316 are free memory. Segment 310 is the free_head indicating the beginning of free memory and segment 316 is the free_tail indicating the end of free memory.

Figure 3C:
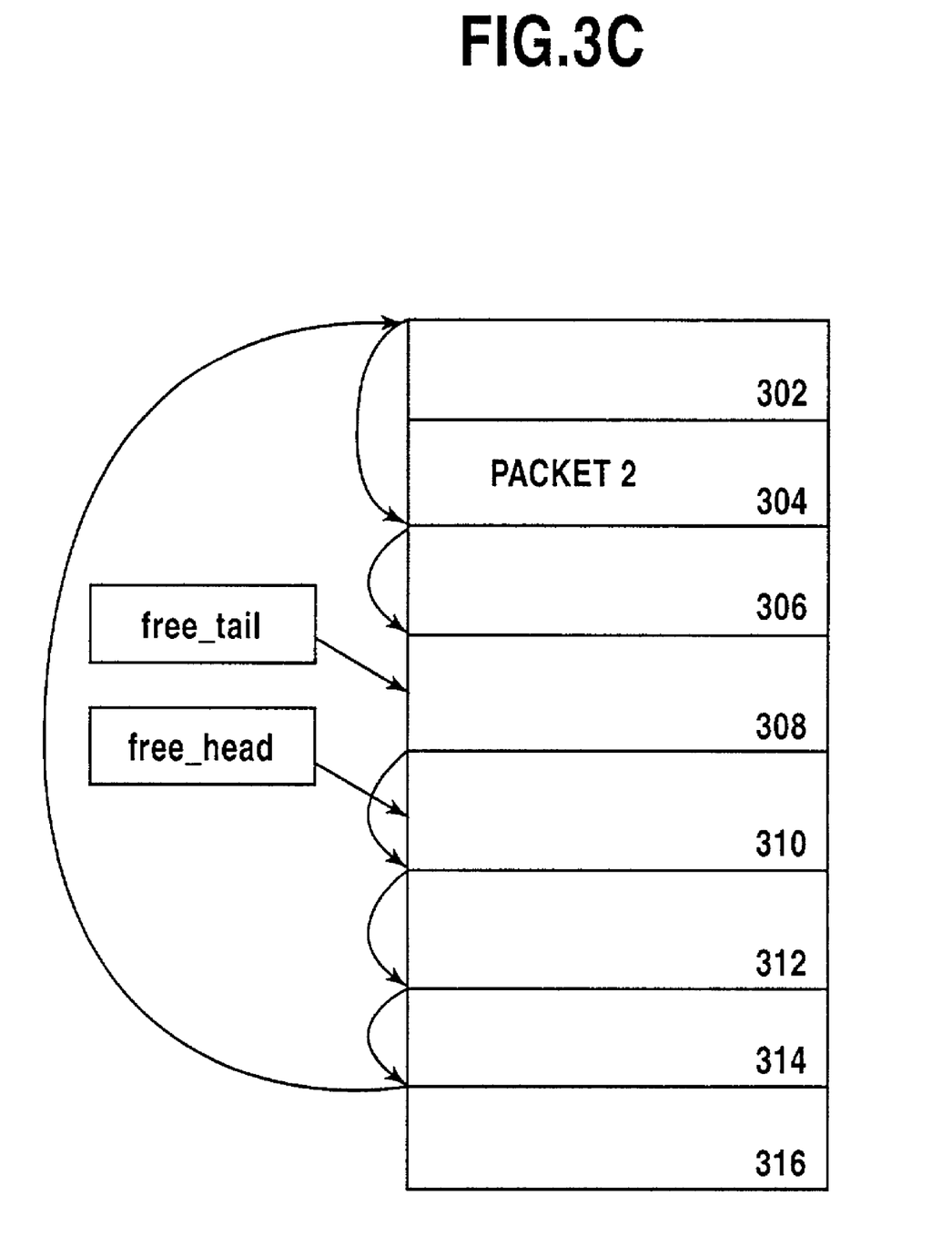
FIG. 3C illustrates a linked list structure of Packet Buffer Memory after the memory occupied by one data packet is freed.

In FIG. 3C packet 1 has been fully transmitted and the Forwarding Manager (FM) has issued a FREE command. Since packet 1 is already in a linked list format it is easy to for the SPM to add the memory occupied by packet 1 to the free memory link list. The free_head, segment 310 remains the same. However, the free_tail is changed. This is accomplished by linking segment 316 to the beginning of packet 1, segment 302, and designating the last segment of packet 1, segment 308, as the free_tail. Now, there is a linked list starting with segment 310 linking to segment 312, segment 312 linking to segment 314, segment 314 linking to segment 316, segment 316 linking to segment 302, segment 302 linking to segment 306 and segment 306 linking to segment 308 where segment 308 is the free_tail.

Figure 3D:
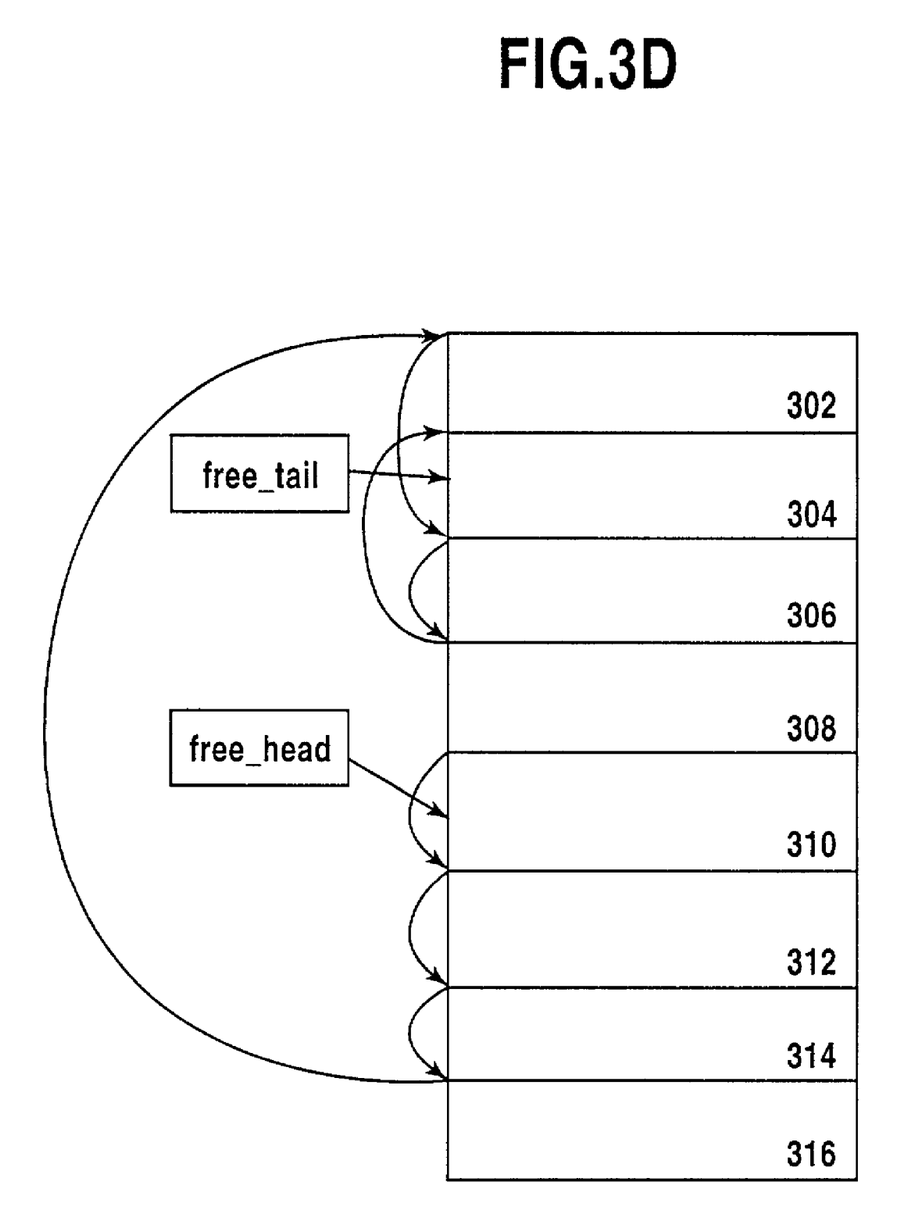
FIG. 3D illustrates a linked list structure of Packet Buffer Memory after the memory occupied by another data packet is freed.

FIG. 3D in this example simply illustrates the PBM Memory after packet 2 has been transmitted successfully and the Forwarding Manager has issued a FREE command over the ATM Bus. The SPM will detect the FREE command and then add the memory space occupied by packet 2 in the PBM Memory to the free memory linked list. In this example segment 308 is linked to the memory occupied by packet 2, segment 304, and segment 304 is identified as the free_tail.

Figure 4:
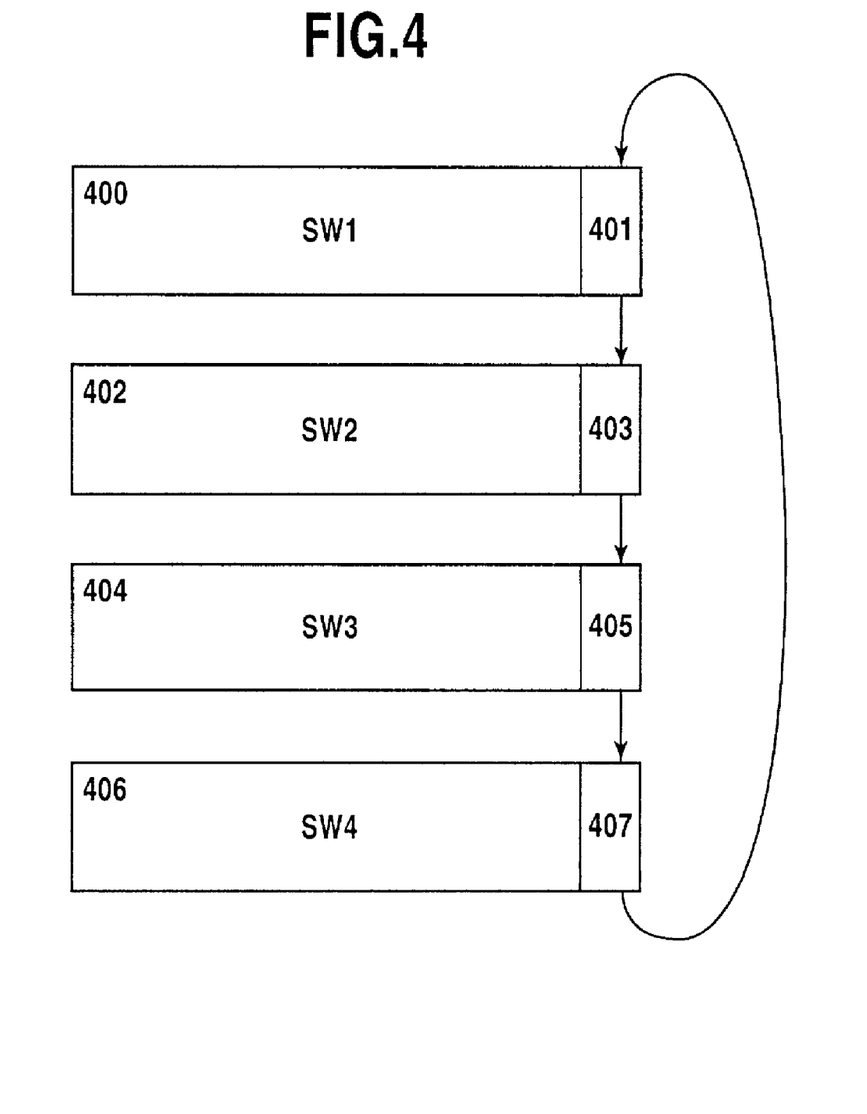
FIG. 4 is an illustration of a plurality of switches in a stacked configuration.

FIG. 4 is an illustration of an example of stacked switches of the present invention. Switch 400, SW1, has a gigabit port 401, switch 402, SW2, has a gigabit port 403, switch 404, SW3, has a gigabit port 405 and switch 406, SW4, has a gigabit port 407. SW1, SW2, SW3 and SW4 are linked together in a simplex loop which simply means that the switches are connected to each other through ports forming a loop so that data flows through the switches in one direction as depicted in FIG. 4. In this example SW1 is connected to SW2 using gigabit port 401 and gigabit port 403, SW2 is connected to SW3 using gigabit port 403 and gigabit port 405, SW3 is connected to SW4 using gigabit port 405 and gigabit port 407 and SW4 is connected to SW1 using gigabit port 407 and gigabit port 401.

However, a problem arises using this type of loop in that a packet will endlessly loop through the stacked switches unless some kind of mechanism is implemented to prevent such endless looping. One solution to this problem is to simply add the Source ID to the data being transferred through the switches. In this example, if the packet is received in SW1 the Source ID for SW1 could be added to the data being transferred from SW1 to SW2 to SW3 to SW4 and back to SW1. In each switch a check would be done to determine if that switch is the originating switch.

In this example, when SW1 receives the data being transferred through the switches, the Source ID for SW1 is added to the data transferred to SW2. SW2 will check the Source ID being transferred to SW2 with the data and see that the Source ID is SW1. Since the Source ID is not SW2, SW2 will continue to process the data and send the data and Source ID to SW3. SW3 will check the Source ID and see that the Source ID is SW1, and therefore, continue to process the data and send the data and Source ID to SW4. SW4 will check the Source ID and see that the Source ID is SW1, and therefore, process the data and send the data and Source ID to SW1. SW1 will check the Source ID as see that it is SW1. Since the Source ID is the same as the switch ID, processing will stop, thereby preventing unnecessary looping of the data.

The shortcoming of the process described above is that by adding the Source ID to the data, the bandwidth that can be used to transmit the data is reduced since some of the bandwidth must be used to transmit the Source ID. For example, if a port were capable of transmitting 64 bits of data, but had to use 8 bits to indicate the Source ID, the actual bandwidth available to transmit data would only be 56 bits (64–8). Therefore, in order to utilize the full 64 bits of bandwidth, the present invention encapsulates the Source ID into the data on the transmit side and decapsulates the Source ID on the receive side.

For example, suppose a 64 bit data packet is to be transmitted with an 8 bit System ID. In order to transmit the data, a port capable of handling a bandwidth of 72 bits must be utilized (64 bits for data and 8 bits for System ID) or the data an System ID would have to be transmitted by the port separately.

However, if the System ID were encapsulated into the data packet a bandwidth of 64 bits would only be needed. For example, if a data packet 0x 60_60_60_60 (i.e. 0x indicates that a hexidecimal number will follow) was to be transmitted with a System ID of 0x 05, the System ID could be encapsulated into the packet by performing an XOR function on the System ID and the data packet.

If the data packet 0x 60_60_60_60 were XORed with the System ID 0x 05 this would result in an encapsulated packet 0x 60_60_60_65. Thus, the System ID would be encapsulated in the packet and would not change the length of the packet. However, if the System ID were added to the packet the packet would be as follows 0x 60_60_60_60_05 adding an extra 8 bits to the length of the packet. Therefore, by encapsulating information in the packet, the length of the packet does not change and the full bandwidth of a port can be utilized for data transmission.

Figure 5:
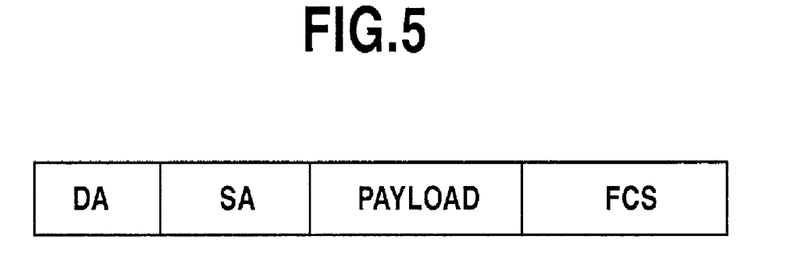
FIG. 5 is an illustration of a data packet in one example of the invention.

FIG. 5 is an example of a data structure that is sent through switches, SW1, SW2, SW3 and SW4. The data structure has a Destination Address field (DA), Source Address field (SA), Payload and Frame Check Sequence field (FCS). The FCS, in this example, is determined by performing a Cyclic Redundancy Check (CRC) function on the DA, SA and Payload of the data structure before transmitting the data from SW1 to SW2. When the data is received by SW2, the same CRC function is performed on the DA, SA and Payload of the data structure to determine a new calculated FCS. If the FCS equals the new calculated FCS value, there are no errors in the data structure. If the new FCS value does not equal the FCS value there are errors in the data structure and the data structure must be resent.

IEEE 802.3 defines a CRC polynomial to calculate the FCS for the 802.3 MAC frame. The FCS field defined in the MAC frame can be used to cooperate with other MAC frame fields to derive a unique frame check number, M, by using the 802.3 compliant CRC polynomial to qualify the packet. For all good CRC packets, their individual CRC value should be the same frame check number, M. The frame check number, M, can vary dependent upon different implementations. However, the CRC and frame check number, M, are the same within a given system.

Figure 6:
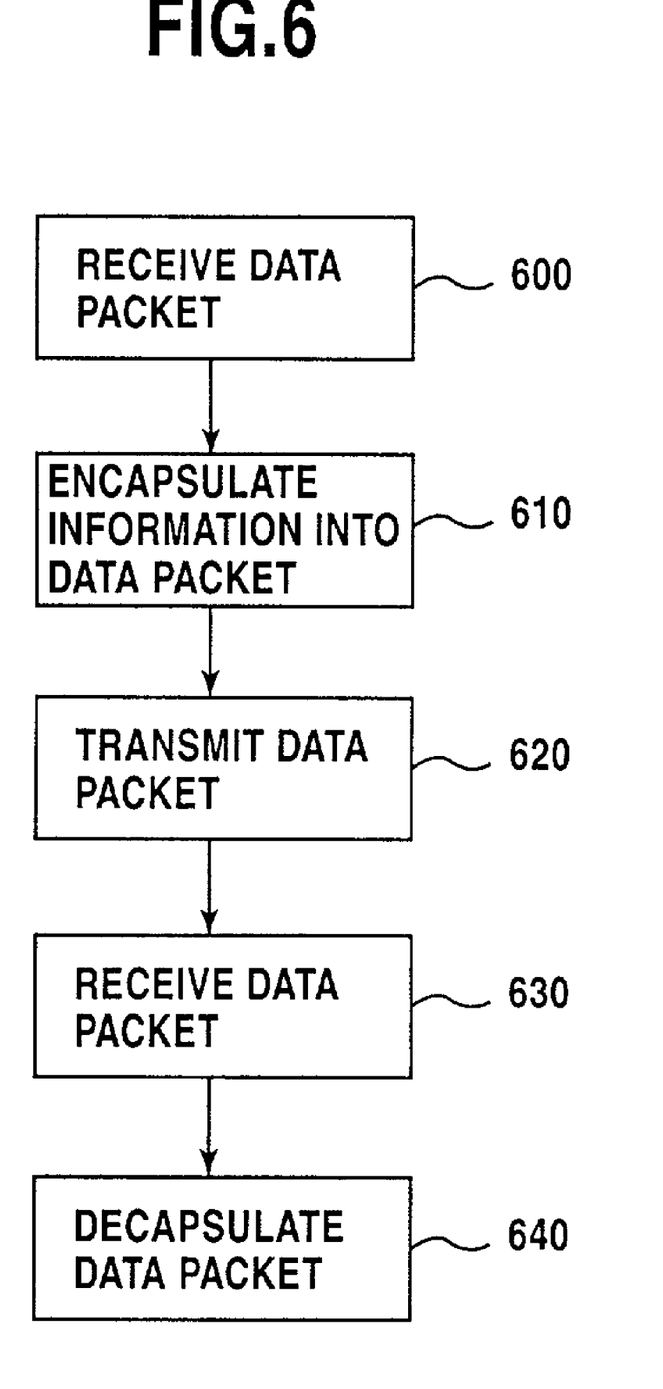
FIG. 6 is a flow diagram of one example of the invention.

In one example of the present invention as depicted in FIG. 6, data encapsulation/decapsulation is performed on the IEEE 802.3 Ethernet packet without changing the packet length thereby maintaining data stream performance. In this example, the Frame Check Sequence (FCS) of the 802.3 packet will be encapsulated with the Source ID on the transmit side and the FCS of the 802.3 packet will be decapsulated on the receive side to identify the encapsulated Source ID.

In step 600 a first switch, SW1, receives a data packet for transmission. In one example of the invention, a CRC polynomial is used to calculate the FCS field of the data packet. In this example under IEEE standards, the CRC polynomial is applied to the data packet to derive a CRC value. In this example, the CRC value is defined under IEEE standards as 0x C7_04_DD_7B (i.e. M=0x C7_04_DD_7B). Therefore the frame check number is 0x C7_04_DD_7B.

In step 610, information is encapsulated into the FCS field of the data packet. In this example, the Switch ID is encapsulated into the FCS field in order to prevent continuous looping of the packet in a stacking environment.

In step 620, the data packet encapsulated, in this example, with the originating Switch ID in the FCS field of the data packet, is transmitted to a second switch, SW2.

In step 630, the second switch, SW2, receives the data packet. In this example, the second switch, SW2, will perform a CRC on the data packet. If no information, such as the originating system ID, was encapsulated into the data packet, a value of 0x C7_04_DD_7B would be returned if there are no errors in the transmission of the data packet. However, since there is encapsulated information in the data packet, the information must be decapsulated from the data packet in order to determine if the data packet transmitted properly.

In step 640, data is decapsulated from the packet. In this example, a table as depicted in FIG. 7 is used to decapsulate the information in the data packet.

Figure 7:
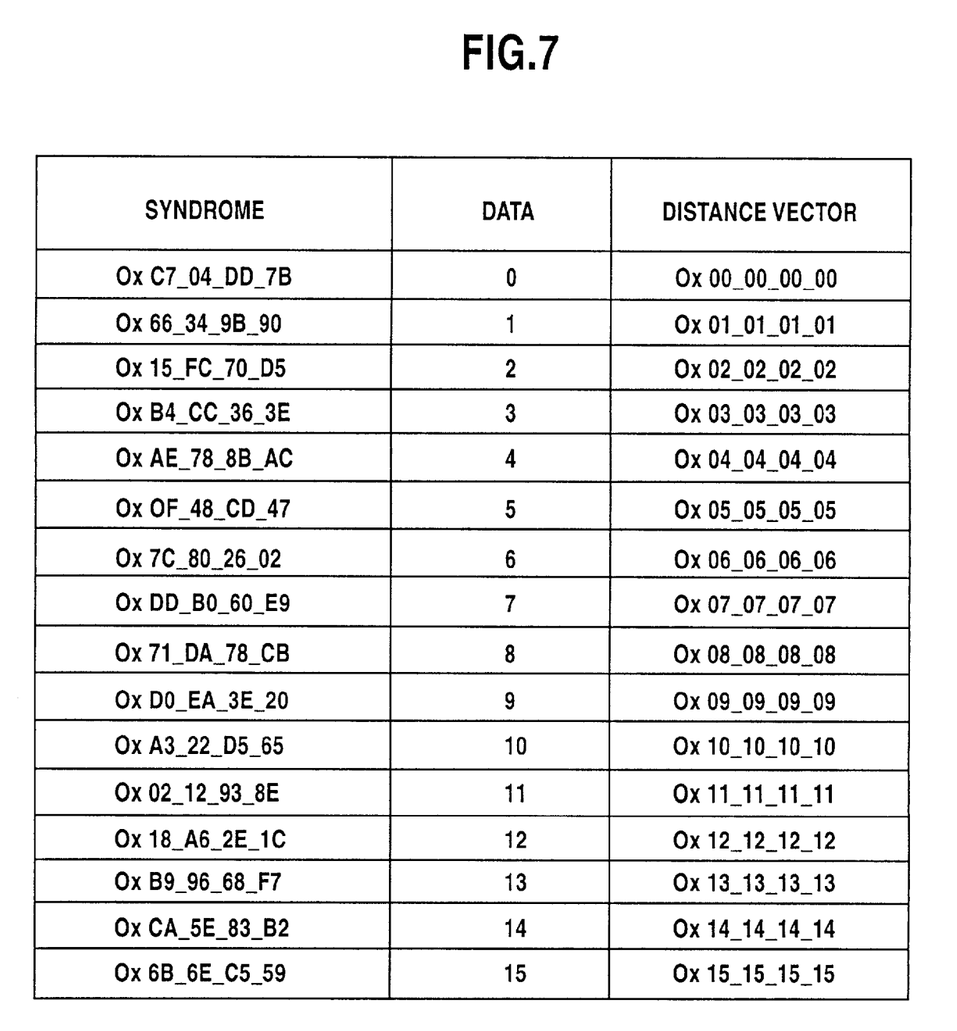
FIG. 7 is a table illustrating information used to encapsulate and decapsulate information from a data packet.

FIG. 7 is a table made up of three columns. The first column is labeled Syndrome and represents all the possible values resulting from a CRC calculation on the entire data packet. The second column is labeled Data and represents information that is to be transferred with the data packet. The third column is labeled Distance Vector and represents the actual data encapsulated into the FCS filed of the data packet.

In the present example, if the originating switch were switch 6, the data transferred with the data packet would be 6. From the table depicted in FIG. 7, the distance vector that should be encapsulated in the FCS field of the data packet should be 0x 06_06_06_06. Therefore, if a CRC polynomial is applied to the entire data packet, a syndrome of 0x 7C_80_26_02 should be returned. Although this value is not the IEEE defined value of 0x C7_04_DD_7B, the value of 0x 7C_80_26_02 is correct since the FCS field of the data packet has been encapsulated with the Distance Vector 0x 06_06_06_06 indicating that the originating switch is switch 6.

Therefore, instead of having only one CRC value, there will be a plurality of valid CRC values. In this example, if there are 16 switches stacked together, there are 16 possible valid CRC values (Syndrome). In the present example, when the second switch, SW2, receives the data packet and performs a CRC on the entire data packet it should be one of the 16 possible Syndromes listed in FIG. 7 in order to be considered a valid packet transfer with no errors. Otherwise the packet is determined not to be a good packet, and will have to be retransmitted.

Figure 8A:
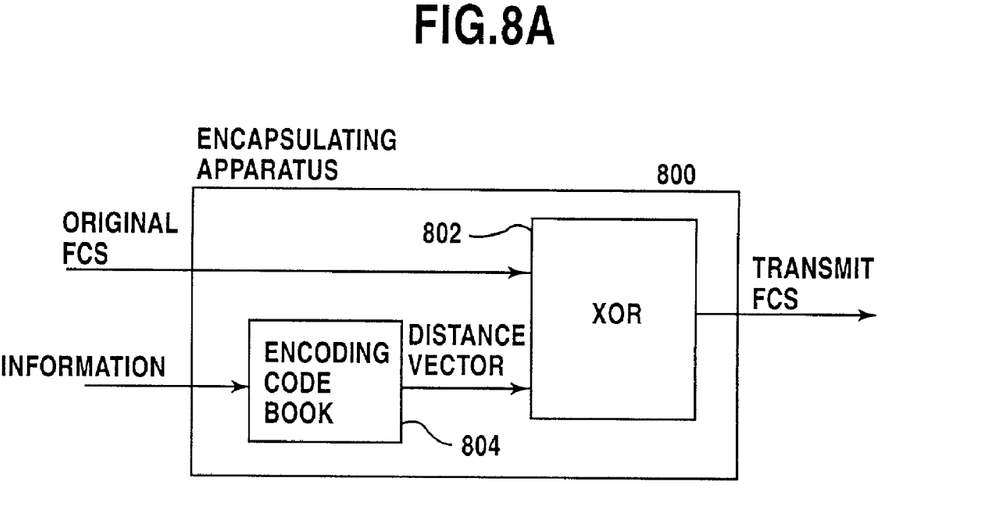
FIG. 8A is an illustration of an example of an encapsulating apparatus of the invention.

FIG. 8A is an illustration of one example of an Encapsulating Apparatus 800. In this example, Encapsulating Apparatus 800 has an XOR module 802 and an Encoding Code Book 804. In one example of the invention, Information to be encapsulated into the FCS field of a data packet is inputted through Encoding Code Book 804. If the Information to be encoded was data such as the number 5, the distance vector would be 0x 05_05_05_05 (see FIG. 7 where a data value of 5 has a distance vector of 0x 05_05_05_05. In this example the original FCS and the distance vectors are used as input to XOR module 805. In this example if the Original FCS were 0x 60_60_60_60 the Transmit FCS would be 0x 65_65_65_65. Information is now encapsulated into the Transmit FCS.

Figure 8B:
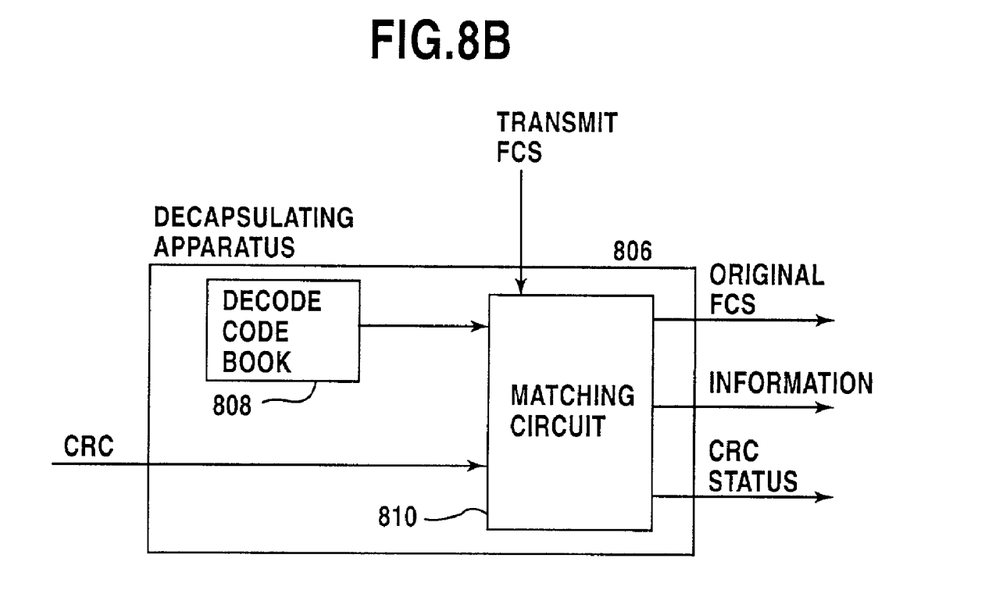
FIG. 8B is an illustration of an example of a decapsulating apparatus of the invention.

FIG. 8B is an illustration of a Decapsulating Apparatus 806 having a Decode Code Book 808 and a Matching Circuit 810. Matching Circuit 810, in this example, uses Decode Code Book 808 to process the Transmit FCS input and the CRC. When the Transmit FCS is received a CRC is executed and would in this case return a value of 0x 0F_48_CD_47. From FIG. 7 it is evident that the data or information being transferred is 5, that the Distance Vector is 0x 05_05_05_05 and therefore the Original FCS is 0x 60_60_60_60 (i.e. Transmit FCS (0x 65_65_65_65) XOR Distance Vector (0x 05_05_05_05). The CRC status would indicate that the data packet was transmitted without any errors. If, however, the CRC did not return the value of 0x 0F_48_CD_47 we would know that there was an error in the transmission of the data packet and the CRC status would indicate an error in data packet transmission.

By encapsulating information into preexisting data fields as described above, information is transferred without changing the packet length thereby maintaining data stream performance by using the full bandwidth available for data transmission. In the past information was tacked onto the beginning or end of a packet thereby decreasing the bandwidth for pure data transmission.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A method for encapsulating and decapsulating information into a data packet being transmitted through a plurality of switches comprising the steps of:
   receiving a data packet in a first switch for transmission to a second switch;
   encapsulating information into a field of said data packet so that said information, when encapsulated into said data packet, does not increase the size of said data packet;
   transmitting said data packet having said information encapsulated in said data packet to said second switch;

receiving said data packet having said information encapsulated in said data packet in said second switch; and decapsulating said information encapsulated in said data packet using a table comprising all possible values from a Cyclic Redundancy Check calculation on said data packet, information transferred with said data packet, and a distance vector encapsulated in said data packet, wherein said step of encapsulating encapsulates said information by performing an XOR function where said data packet is XORed with said information.

2. The method as recited in claim 1, wherein said step of encapsulating information into a field of said data packet further comprises the step of using an encode code book to encapsulate said information into a field of said data packet.

3. The method as recited in claim 1, wherein said information is encapsulated into a Frame Check Sequence field of said data packet.

4. The method as recited in claim 3, wherein said step of encapsulating information into said Frame Check Sequence field of said data packet further comprises the step of performing a function where said Frame Check Sequence field of said data packet is XORed with said information.

5. The method as recited in claim 1, wherein said step of decapsulating said information encapsulated in said data packet comprises the step of using a decoding code book to decapsulate said information encapsulated in said data packet.

6. The method as recited in claim 1, wherein said information encapsulated in said data packet is decapsulated from a Frame Check Sequence field of said data packet.

7. The method as recited in claim 6, further comprising the step of performing a Cyclic Redundancy Check on said data packet to determine if there was an error in transmitting said data packet.

8. The method as recited in claim 1, further comprising the step of determining if an error occurred in the transmission of said data packet.

9. The method as recited in claim 1, further comprising the step of determining an error occurred in the transmission of said data packet if said information encapsulated in said data packet cannot be determined.

10. The method as recited in claim 1, further comprising the step of determining an error occurred in the transmission of said data packet if said information encapsulated in said data packet cannot be identified in a decode code book.

11. A system for encapsulating and decapsulating information into a data packet being transmitted through a plurality of switches comprising:
a first switch comprising:
a transmitter; and
an encapsulating module that encapsulates information into a field of a data packet so that said information, when encapsulated into said data packet, does not increase the size of said data packet; and
a second switch comprising:
a receiver, wherein when said transmitter of said first switch transmits said data packet having said information encapsulated in said data packet to said receiver of said second switch, wherein said receiver of said second switch receives said data packet having said information encapsulated in said data packet; and
a decapsulating module that decapsulates said information encapsulated in said data packet to determine said information encapsulated in said data packet, wherein said encapsulating module encapsulates said information by performing an XOR function where said data packet is XORed with said information and wherein said decapsulating module decapsulates said information using a table comprising a first column having all possible values from a Cyclic Redundancy Check calculation on said data packet, a second column having information transferred with said data packet, and a third column having a distance vector encapsulated in said data packet.

12. The system as recited in claim 11, wherein said encapsulating module uses an encode code book to encapsulate said information into a field of said data packet.

13. The system as recited in claim 11, wherein said encapsulating module encapsulates said information into a Frame Check Sequence field of said data packet.

14. The system as recited in claim 11, wherein said encapsulating module encapsulates information into a Frame Check Sequence field of said data packet by performing a function on said Frame Check Sequence of said data packet and said information, where said Frame Check Sequence field of said data packet is XORed with said information.

15. The system as recited in claim 11, wherein said decapsulating module decapsulates said information encapsulated in said data packet using a decoding code book to decapsulate said information encapsulated in said data packet.

16. The system as recited in claim 11, wherein said decapsulating module decapsulates said information encapsulated in said data packet from a Frame Check Sequence field of said data packet.

17. The system as recited in claim 16, wherein said decapsulating module performs a Cyclic Redundancy Check on said data packet to determine if there was an error in transmitting said data packet.

18. The system as recited in claim 11, wherein said decapsulating module determines if an error occurred in the transmission of said data packet.

19. The system as recited in claim 11, wherein said decapsulating module determines that an error occurred in the transmission of said data packet if said information encapsulated in said data packet cannot be determined.

20. The system as recited in claim 11, wherein said decapsulating module determines an error occurred in the transmission of said data packet if said information encapsulated in said data packet cannot be identified in a decode code book.

21. A switch for encapsulating and decapsulating information into a data packet, the switch comprising:
a transmitter that transmits data packets;
an encapsulating module that encapsulates information into a data packet before said transmitter transmits said data packet;
a receiver for receiving transmitted data packets; and
a decapsulating module that decapsulates information from said transmitted data packets received by said receiver, wherein said encapsulating module encapsulates said information by executing an XOR function where said data packet is XORed with said information and wherein said decapsulating module decapsulates said information using a table comprising a first column having all possible values from a Cyclic Redundancy Check calculation on said data packet, a second column having information transferred with said data packet, and a third column having a distance vector encapsulated in said data packet.

22. The switch as recited in claim 21, wherein said encapsulating module has an encode code book to encapsulate said information into a field of said data packet.

23. The switch as recited in claim 21, wherein said encapsulating module encapsulates said information into a Frame Check Sequence field of said data packet.

24. The switch as recited in claim 21, wherein said encapsulating module encapsulates information into a Frame Check Sequence field of said data packet using a function on said Frame Check Sequence of said data packet and said information where said Frame Check Sequence field of said data packet is XORed with said information.

25. The switch as recited in claim 21, wherein said decapsulating module has a decoding code book, wherein said decapsulating module decapsulates information encapsulated in said data packet using said decoding code book to decapsulate said information encapsulated in said data packet.

26. The switch as recited in claim 21, wherein said decapsulating module decapsulates said information encapsulated in said data packet from a Frame Check Sequence field of said data packet.

27. The switch as recited in claim 26, wherein said decapsulating module has a Cyclic Redundancy Check, wherein said Cyclic Redundancy Check performs an error check on said data packet.

28. The switch as recited in claim 21, wherein said decapsulating module has an error detector that determines if an error occurred in the transmission of said data packet.

29. The switch as recited in claim 21, wherein said decapsulating module determines that an error occurred in the transmission of said data packet if said information encapsulated in said data packet cannot be determined.

30. The switch as recited in claim 21, wherein said decapsulating module has a decode code book, wherein said decapsulating module determines an error occurred in the transmission of said data packet if said information encapsulated in said data packet cannot be identified in said decode code book.

* * * * *